(12) United States Patent
Sasaki (10) Patent No.: US 9,868,467 B2
(45) Date of Patent: Jan. 16, 2018

(54) VEHICLE BODY FRONT PORTION STRUCTURE

(71) Applicant: Toyota Jidosha Kabushiki Kaisha, Toyota-shi, Aichi-ken (JP)

(72) Inventor: Takashi Sasaki, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 15 days.

(21) Appl. No.: 15/240,038

(22) Filed: Aug. 18, 2016

(65) Prior Publication Data

US 2017/0073013 A1 Mar. 16, 2017

(30) Foreign Application Priority Data

Sep. 15, 2015 (JP) ................................. 2015-182216

(51) Int. Cl.
*B62D 21/15* (2006.01)
*B62D 29/00* (2006.01)
*B62D 25/08* (2006.01)

(52) U.S. Cl.
CPC ......... *B62D 21/152* (2013.01); *B62D 25/082* (2013.01); *B62D 29/008* (2013.01)

(58) Field of Classification Search
CPC ...... B62D 21/15; B62D 21/152; B62D 25/08; B62D 25/082; B62D 29/008
USPC .......................... 296/187.09, 193.09, 203.02
See application file for complete search history.

(56) References Cited

U.S. PATENT DOCUMENTS

| 5,951,097 A | * | 9/1999 | Esposito | B62D 25/082 296/187.09 |
| 2011/0309655 A1 | | 12/2011 | Mori | |
| 2016/0068193 A1 | * | 3/2016 | Koike | B62D 25/082 296/187.09 |
| 2016/0129869 A1 | * | 5/2016 | Le | B60R 21/26 701/45 |

FOREIGN PATENT DOCUMENTS

| JP | 2010-221991 A | 10/2010 |
| JP | 2012-035759 A | 2/2012 |

* cited by examiner

*Primary Examiner* — Jason S Daniels
(74) *Attorney, Agent, or Firm* — Dinsmore & Shohl LLP (57) ABSTRACT

The present disclosure provides a vehicle body front portion structure including: a front side member main body to which a bead is formed at rear portion of an outer-side side wall portion, and is joined to a front side member base portion such that the front side member base portion covers a portion of an outer circumferential surface of the front side member main body located at vehicle body rear side of the bead. Abutting ribs extending in vehicle body front-rear direction are provided at a portion of the front side member base portion. The abutting ribs include a front-side extended portion located at a side portion of the bead and extends towards vehicle body front side beyond a portion that protrudes in vehicle body transverse direction, and include an abutting portion that faces towards vehicle body front side.

4 Claims, 5 Drawing Sheets

VEHICLE BODY FRONT PORTION STRUCTURE

CROSS-REFERENCE TO RELATED APPLICATION

This application is based on and claims priority under 35 USC 119 from Japanese Patent Application No. 2015-182216 filed on Sep. 15, 2015, the disclosure of which is incorporated by reference herein.

BACKGROUND

Technical Field

The present disclosure relates to a vehicle body front portion structure.

Related Art

Technology is known in which, in a vehicle body front portion, in a case in which the vehicle is in a frontal collision, the collision energy is absorbed as a result of a front side member undergoing bending deformation in a desired location (see for example, Japanese Patent Application Laid-Open (JP-A) No. 2010-221991, and JP-A No. 2012-35759.

However, in recent years, in order to reduce vehicle weight, investigations have been made to use, for example, an aluminum alloy or a magnesium alloy or the like, for forming a front side member. However, compared to steel, aluminum alloy tends to fracture more easily. Thus, in a case in which the front side member fractures while undergoing bending deformation during a vehicle frontal collision, such case may lead to disadvantage in absorbing the collision energy.

SUMMARY

The present disclosure provides a vehicle body front portion structure that may efficiently absorbed collision energy when a vehicle is in a frontal collision, even in a case in which a front side member that is formed of either aluminum, an aluminum alloy, magnesium, or a magnesium alloy.

A first aspect of the present disclosure is a vehicle body front portion structure, comprising: a front side member main body portion formed of aluminum, an aluminum alloy, magnesium, or a magnesium alloy, the front side member main body portion having a left side wall portion and a right side wall portion that extend in a vehicle body front-rear direction at side portions of a vehicle body front portion, and having a bend starting portion formed at a rear portion of one side wall portion of the left side wall portion or the right side wall portion, the bend starting portion forming a starting portion of a bend in a vehicle body transverse direction in a case in which a load is input from a vehicle body front side; a front side member base portion formed of aluminum, an aluminum alloy, magnesium, or a magnesium alloy, the front side member base portion being joined to a dash panel, and being joined to the front side member main body panel at portions located further to a vehicle body rear side than the bend starting portion so as to cover an external surface including at least the left side wall portion and the right side wall portion; and ribs protruding toward an opposite side in the vehicle body transverse direction from the side at which the one side wall portion is located and extending in the vehicle body front-rear direction, the ribs being provided at a facing portion of the front side member base portion that faces the one side wall portion or at a location to the vehicle body rear side of the facing portion, each of the ribs having a front-side extended portion that extends to the vehicle body front side beyond a portion that protrudes in the vehicle body transverse direction and that is positioned on a side of the bend starting portion, and each of the ribs having, at a front end, an abutting portion that, in a case in which the front side member main body portion is bent in the vehicle transverse direction with the bend starting portion forming a starting portion in response to a load being input from the vehicle body front side, abuts against the front side member main body portion.

According to the above-described structure, a bend starting portion that forms a bend starting portion in a case in which a front side member main body portion is bent in the vehicle body transverse direction in response to a load that is input from the vehicle body front side is formed at a rear portion of one side wall portion of the front side member main body portion. A front side member base portion is joined to the front side member main body portion so as to cover an external surface of at least a pair of left and right side wall portions located at the vehicle body rear side of bend starting portion. Accordingly, in a case in which a collision load is input to the front side member main body portion during a vehicle frontal collision, the front side member main body portion undergo bending deformation with the bend starting portion forming the starting portion for this bending deformation.

Here, ribs that protrude at the opposite side in the vehicle transverse direction from the side to which the one side wall portion is located and that extend in the vehicle body front-rear direction are provided in portions of the front side member base portion that are located at a facing portion that faces the one side wall portion, or at the vehicle body rear side of this facing portion. The ribs include a front-side extended portion located at one side of the bend starting portion and that extends towards the vehicle body front side beyond the portion protruding in the vehicle body transverse direction. Further, the ribs include, at a front end thereof, abutting portions that, in a case in which the front side member main body portion is bent in the vehicle body transverse direction from the bend starting portion in response to a load being input from the vehicle body front side, abut against the front side member main body portion. Accordingly, in a case in which the front side member main body portion undergoes a predetermined amount of bending deformation from the bend starting portion which is the bend starting portion, since the front side member main body portion abuts against the abutting portion of the ribs and is supported by the front-side extended portion, the bending deformation of the front side member main body portion may be suppressed. As a result, since fracturing of the front side member main body portion may be prevented or suppressed before occurring, the energy absorption performance of the front side member main body portion may be performed efficiently.

A second aspect, in the above first aspect, a joining flange portion joined to the dash panel may be provided at the front side member base portion; and each of the ribs may be provided with a rear-side extended portion extending to the vehicle body rear side beyond the portion protruding in the vehicle body transverse direction, and reaching as far as the joining flange portion.

According to the above-described structure, since the joining flange portion joined to the dash panel is provided at the front side member base portion, and the ribs include a rear-side extended portion that extends towards the vehicle body rear side beyond the portion that protrudes in the vehicle body transverse direction and reaches the joining flange portion, the ribs are supported during a vehicle frontal collision by the dash panel side via the joining flange portion. Accordingly, the front side member main body portion may be supported with greater stability by the ribs.

A third aspect, in the above first aspect, a weakened portion, extending towards the vehicle body front side from a front end of the front-side extended portion, may be formed at each of the ribs, and rigidity with respect to a load from the vehicle front side may be set lower at the weakened portion than at other portions of the ribs.

According to the above-described structure, in a case in which the front side member main body portion undergoes bending deformation during a vehicle frontal collision from the bend starting portion, the front side member main body portion abuts against a weakened portion of the ribs. Accordingly, the weakened portion of the ribs deform, and thus, the collision energy may be absorbed by a corresponding amount. When the deformation of the weakened portion of the ribs has ended, the front side member main body portion may be stably supported by the ribs.

A forth aspect, in the above first aspect, the front side member main body portion may slope towards an outer side in the vehicle body transverse direction on progression towards the vehicle body front side, and the bend starting portion is formed at a rear portion of an outer-side side wall portion located at an outer side in the vehicle body transverse direction from among the left side wall portion and the right side wall portion.

According to the above-described structure, since the front side member main body portion slopes towards an outer side in the vehicle transverse direction on progression towards the vehicle body front side, when vehicle frontal collision occurs, bending moment to bend the front side member main body portion towards the outer side in the vehicle body transverse direction is generated. Here, since the bend starting portion is formed at a rear portion of the outer-side side wall portion that is located at the outer side in the vehicle transverse direction from among the pair of left and right side wall portions, when vehicle frontal collision occurs, the bending direction of the front side member main body portion may be controlled with even greater stability.

As described above, the vehicle body front portion structure according to the present disclosure may efficiently absorb the collision energy when a vehicle is in a frontal collision, even in a case in which a front side member is formed of either aluminum, an aluminum alloy, magnesium, or a magnesium alloy.

BRIEF DESCRIPTION OF THE DRAWINGS

Exemplary embodiments of the present disclosure will be described in detail based on the following figures, wherein.

DETAILED DESCRIPTION

First Exemplary Embodiment

A vehicle body front portion structure according to a first exemplary embodiment of the present disclosure will now be described using FIG. 1 through FIG. 4B. Note that an arrow FR, an arrow UP, and an arrow IN that are illustrated where appropriate in the drawings respectively indicate a vehicle body front side, a vehicle body upper side, and an inner side in a vehicle body transverse direction. Hereinafter, unless specifically stated otherwise, if simple front-rear, up-down, or left-right directions are used, then these refer respectively to the front-rear direction of the vehicle body, the up-down direction of the vehicle body, and the left-right direction of the vehicle body in relation to the direction of forward travel of the vehicle.

Figure 1:
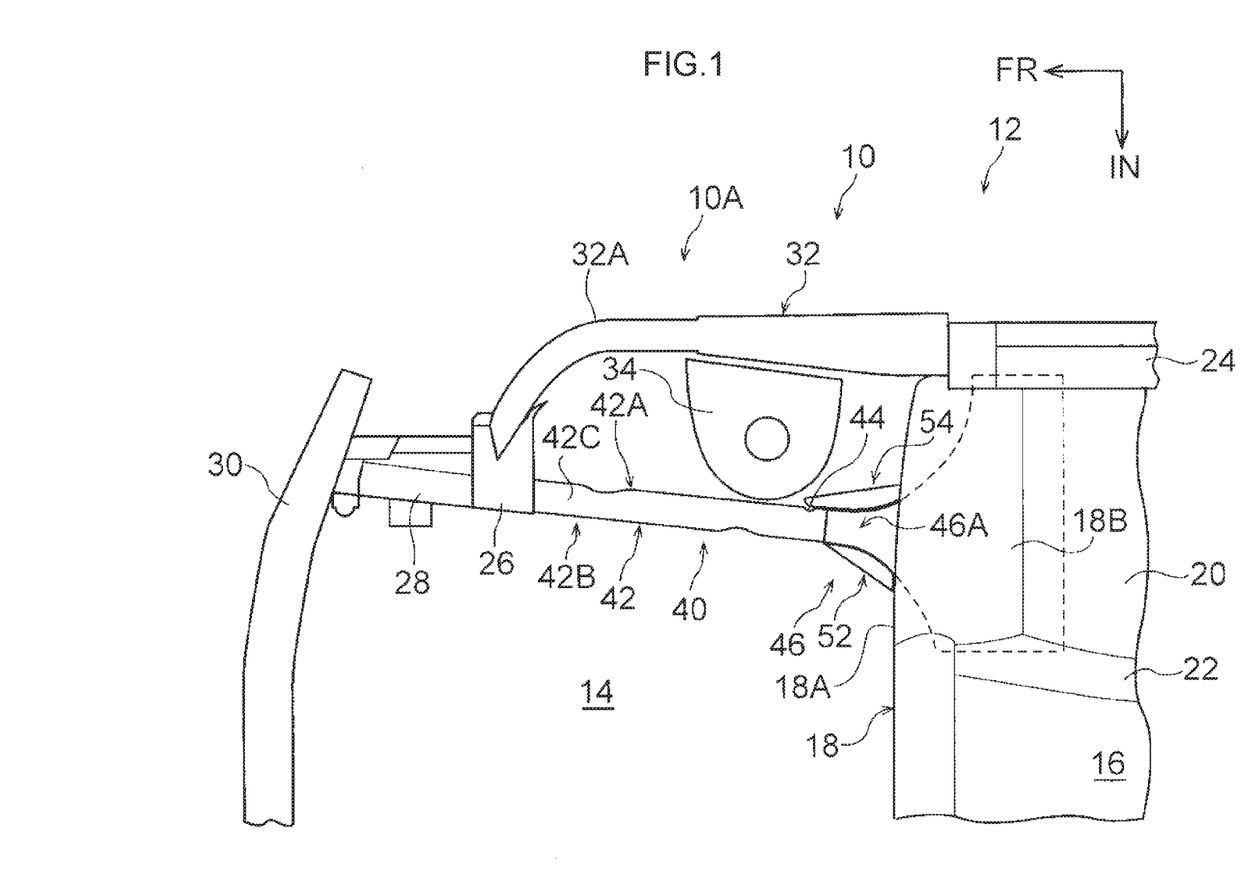
FIG. 1 is a plan view illustrating a vehicle body front portion structure according to a first exemplary embodiment.
Figure 2:
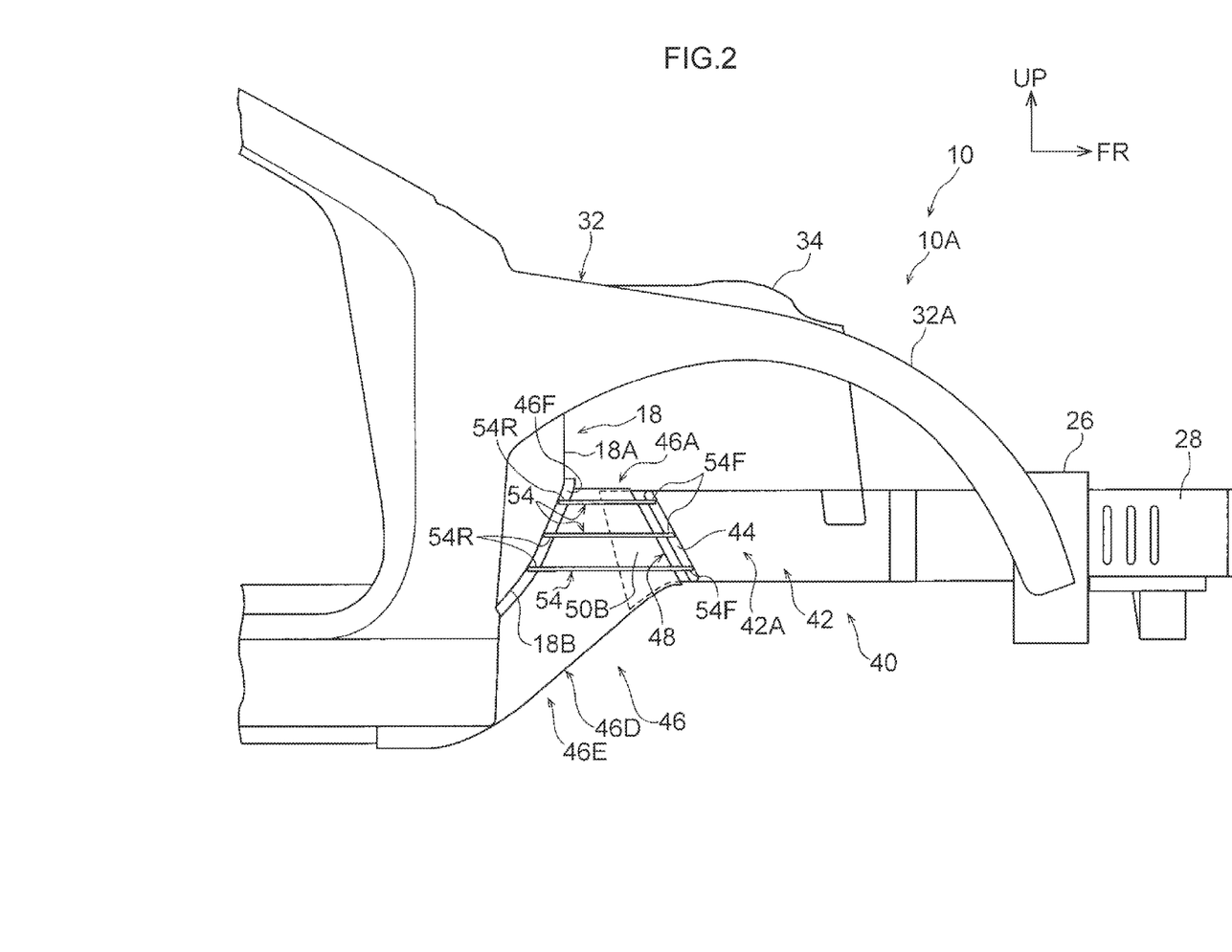
FIG. 2 is an enlarged side view illustrating the vehicle body front portion structure illustrated in FIG. 1 as seen from an outer side in a vehicle body transverse direction.
Figure 3:
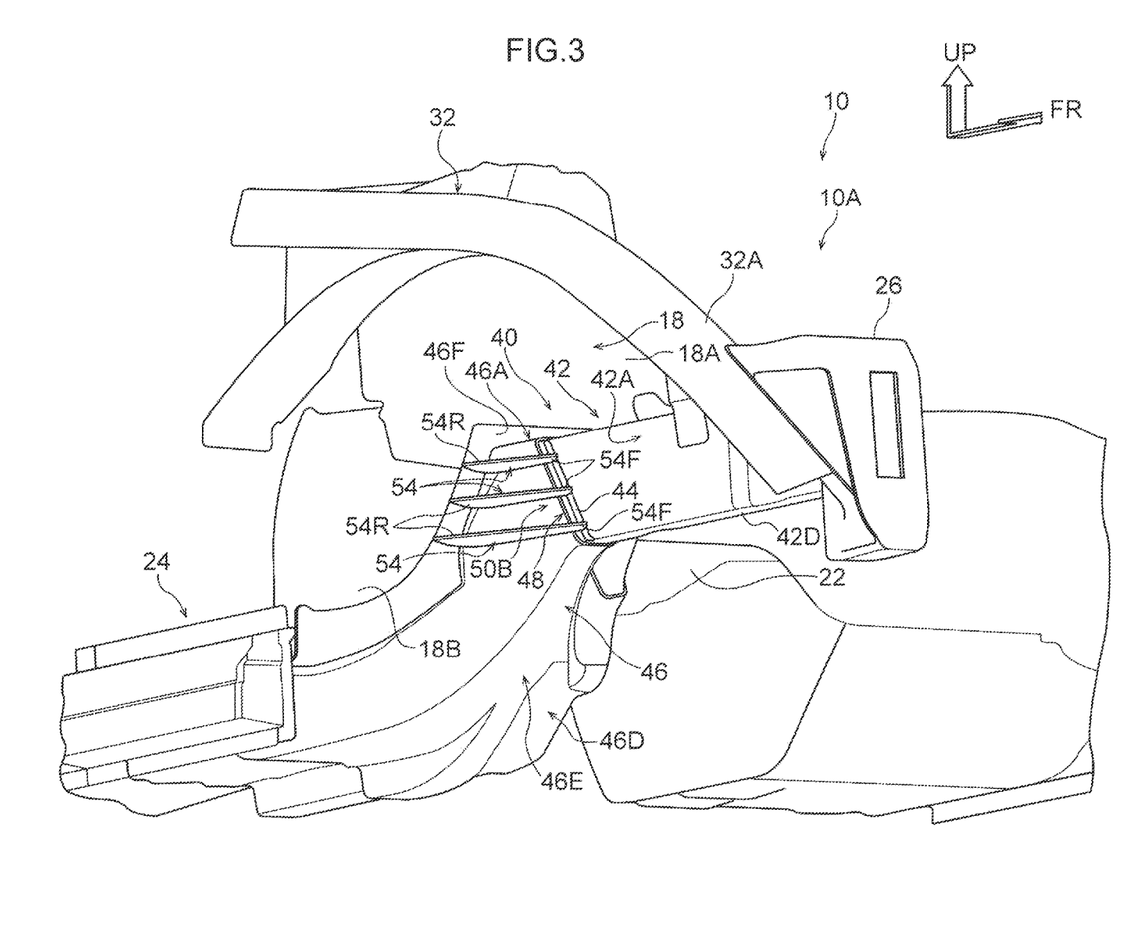
FIG. 3 is an enlarged perspective view illustrating the vehicle body front portion structure illustrated in FIG. 1 as seen from a direction diagonally to the front and to the vehicle outer side in the vehicle body transverse direction.

In FIG. 1, a portion of a vehicle body right side of an automobile (i.e., a vehicle) 12 to which a vehicle body front portion structure 10 according to the present exemplary embodiment is illustrated in plan view. Note that, in FIG. 1, a left side of the vehicle body has been omitted from the drawing, however, fundamentally, the vehicle body front portion structure 10 is formed symmetrically at left and right. In FIG. 2, an enlarged side view of the vehicle body front portion structure 10 illustrated in FIG. 1 as seen from the vehicle body right side (i.e., an outer side in the vehicle body transverse direction) is illustrated. In FIG. 3, an enlarged perspective view of the vehicle body front portion structure 10 illustrated in FIG. 1 as seen from a direction diagonally to the front and to the outer side in the vehicle body transverse direction is illustrated. Note that, in FIG. 3, in order to make the drawing easier to view, a front side member 40 and the like on the vehicle body left side have been omitted from the drawing.

As illustrated in FIG. 1, in the automobile 12, a power unit chamber 14 and a cabin (i.e., a vehicle compartment) 16 that is located on the vehicle body rear side of the power unit chamber 14 are partitioned from each other by a dash panel (i.e., a vehicle body passenger cabin front wall) 18. A vertical plate portion 18A formed in a substantially vertical plate shape is provided at a top portion of the dash panel 18. As illustrated in FIG. 2, a bottom portion of the dash panel 18 includes a toe board portion 18B that is provided integrally with the vertical plate portion 18A and is formed in an inclined plate shape. The toe board portion 18B slopes towards the vehicle body rear side on progression towards the vehicle body lower side. As illustrated in FIG. 1, a front end portion of a floor panel 20 is joined by welding or the like to a lower end portion of the toe board portion 18B so as to be formed integrally therewith. The floor panel 20 forms a floor surface of the cabin 16.

A tunnel 22 is provided in a central portion in the vehicle body transverse direction of the toe board 18B and the floor panel 20. The tunnel 22 is formed substantially in an inverted U shape that is open on the vehicle body lower side when seen in a vehicle body front view, and extends in the vehicle body front-rear direction. An end portion on the outer side in the vehicle body transverse direction of the floor panel 20 is combined with a rocker (also known as a side sill) 24. The rocker 24 is a framework component having a closed cross-sectional structure that extends in the vehicle body front-rear direction at a lower end portion of a vehicle body side portion, and is placed within a range that includes a bottom edge side of a side door opening portion.

A power unit (not illustrated in the drawings) is housed in the power unit chamber 14 that is formed at the vehicle body front side of the cabin 16. In the present exemplary embodiment, as an example, the power unit is configured so as to include an engine and a motor. Further, the power unit chamber 14 can be regarded as being a so-called engine compartment.

A front side member main body portion 42 that forms a main body portion of a pair of left and right front side members 40 that are located at both sides in the vehicle body transverse direction is provided in a lower portion of the power unit chamber 14. The front side member main body portion 42 extends in the vehicle body front-rear direction at a side portion of a vehicle body front portion 10A. Note that the front side member 40 will be described below. A crash box 28 is fixed via a linking component 26 to a front end portion of the front side member main body portion 42. As illustrated in FIG. 1 and FIG. 2, an apron upper member 32 is located at a vehicle body upper side and on an outer side in the vehicle body transverse direction of the front side member main body portion 42. This apron upper member 32 extends in the vehicle front-rear direction and a front end portion of an apron brace 32A that forms a front portion of the apron upper member 32 is fixed to the linking component 26. A suspension tower 34 is provided between a rear portion of the front side member main body portion 42 and a rear portion of the apron upper member 32. Note that, in FIG. 1, an outer peripheral portion side of the suspension tower 34 has been omitted from the drawing.

As illustrated in FIG. 1, a bumper reinforcement 30 is fixed to a front end portion of the crash box 28. The bumper reinforcement 30 is disposed at the vehicle body front portion 10A such that the longitudinal direction thereof is aligned in the vehicle body transverse direction. Note that the bumper reinforcement 30 forms part of a front bumper.

The pair of left and right front side member main body portions 42 support the power unit via engine mounts (not illustrated in the drawings), and although they extend in the vehicle body front-rear direction, they are inclined slightly towards the outer side in the vehicle body transverse direction as they move towards the vehicle body front side. The front side member main body portion 42 is formed of an aluminum alloy. Note that, although an aluminum alloy is more lightweight than a steel material. However, since an aluminum alloy stretches less when it is bent, it tends to fracture more easily than steel if it does become bent. Moreover, in the present exemplary embodiment, the front side member main body portion 42 is formed of an aluminum alloy. However, the front side member main body portion 42 may be formed of aluminum, magnesium, or a magnesium alloy.

In the front side member main body portion 42, a cross-sectional configuration orthogonal to the longitudinal direction thereof is formed as a rectangular closed cross-sectional portion. Namely, the front side main member body portion 42 includes, as a pair of left and right side wall portions, an outer-side side wall portion 42A (see FIG. 4A) that forms a side wall portion on the outer side in the vehicle body transverse direction, and an inner-side side wall portion 42B (see FIG. 4A) that forms a side wall portion on the inner side in the vehicle body transverse direction. Further, the front side member main body portion 42 includes a top wall portion 42C that joins upper ends of the outer-side side wall portion 42A and the inner-side side wall portion 42B in the vehicle body transverse direction, and a bottom wall portion 42D that joins lower ends of the outer-side side wall portion 42A and the inner-side side wall portion 42B in the vehicle body transverse direction.

As illustrated in FIG. 3, as a bend starting portion, a bead 44 (i.e., a recessed portion) is formed at a rear portion of the outer-side side wall portion 42A (i.e., in one side wall portion) that is hollowed towards the inner side of the closed cross-section (i.e., towards the side wall inner surface side) of the front side member main body portion 42, and that extends in the vehicle body up-down direction (more accurately, sloping slightly towards the vehicle rear side on progression towards the vehicle body upper side). This bead 44 is provided in order to induce bending in the front side member main body portion 42 in a case in which the vehicle is in a frontal collision. Namely, the bead 44 forms the starting portion of the bending of the front side member main body portion 42 towards the outer side in the vehicle body transverse direction, in a case in which a load is input from the vehicle body front side. Note that, in the front side member main body portion 42 of the present exemplary embodiment, beads are also formed at a front end portion of the outer-side side wall portion 42A and in an intermediate portion in the vehicle body front-rear direction of the inner-side side wall portion 42B (see FIG. 1) in order to induce bending in the front side member main body portion 42 in a case in which the vehicle is in a frontal collision. However, a detailed description thereof has been omitted.

The front side member 40 includes a front side member base portion 46 (also known as a kick reinforcement) on a rear end portion side of the front side member main body portion 42. The front side member base portion 46 is formed of die cast of an aluminum alloy. Note that, in the present exemplary embodiment, the front side member base portion 46 is formed of an aluminum alloy. However, the front side member base portion 46 may be formed of aluminum, magnesium, or a magnesium alloy. The front side member base portion 46 includes a rectangular cylindrical portion 46A at a front end portion side thereof. The rectangular cylindrical portion 46A is joined by arc welding (i.e., via a linear weld portion) to the front side member main body portion 42 such that the entire periphery of the external surface (i.e., the external peripheral surface) of the front side member main body portion 42 at the vehicle body rear side of the bead 44 is covered by the rectangular cylindrical portion 46A. As a result, as illustrated in FIG. 2, a separation portion 48 is set at the vehicle body rear side of the bead 44 between the front side member main body portion 42 and the front side member base portion 46. Moreover, in the present exemplary embodiment, the direction in which the separation portion 48 extends is parallel with the direction in which the bead 44 extends.

Figure 4A:
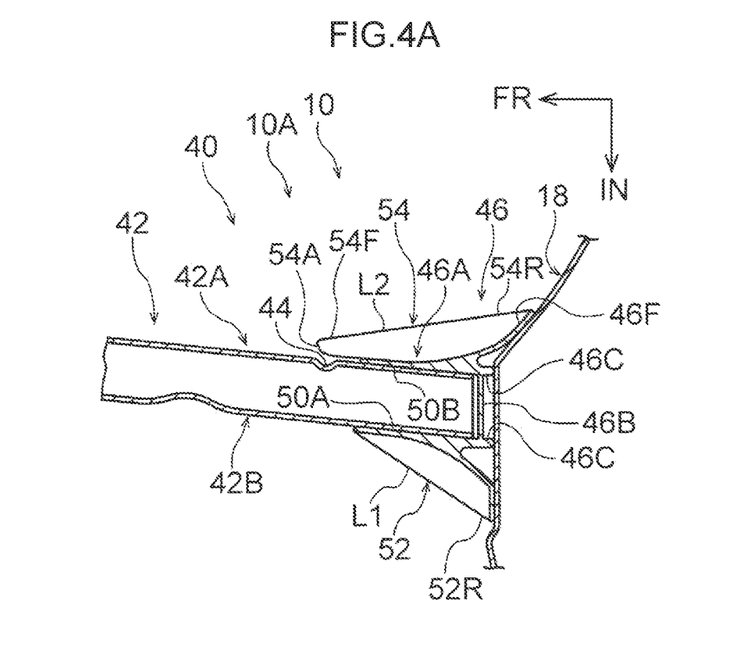
FIG. 4A is a horizontal cross-sectional view illustrating a state of the vehicle body front portion structure illustrated in FIG. 1 prior to vehicle frontal collision.

FIG. 4A is a horizontal cross-sectional view of a rear portion of the front side member main body portion 42 illustrated in FIG. 1 and of the rectangular cylindrical portion 46A and the like of the front side member base portion 46. As illustrated in FIG. 4A, a rear end portion of the rectangular cylindrical portion 46A is closed by an occluding wall portion 46B. Reinforcing ribs 46C that protrude to the dash panel 18 side are formed at both sides of the occluding wall portion 46B.

Moreover, as illustrated in FIG. 2, the front side member base portion 46 includes a kick portion 46D that extends downwards and to the rear of the vehicle body along the dash panel 18 (i.e., with the toe board portion 18B), and is joined to the dash panel 18. Note that, although omitted from the drawings, at the inner surface side of the kick portion 46D, the reinforcing rib 46C illustrated in FIG. 4A extends downwards and to the rear of the vehicle body along the toe board portion 18B illustrated in FIG. 2. The kick portion 46D illustrated in FIG. 3 is formed in substantially a hat shape whose cross-sectional configuration is open to the vehicle body upward side when the cross-section is taken in the vehicle body transverse direction, and includes a substantially U-shaped bulging portion 46E that is open to the vehicle body upper side. Namely, the bulging portion 46E forms the portion between flanges (i.e., a portion of a joining flange portion 46F, described below) on both sides of the kick portion 46D. The bulging portion 46E is shaped such that it opens outwards both sides on the vehicle body transverse direction on progression towards the vehicle body rear side, and corner portions at both sides of the bulging portion 46E extend in an outwardly splayed curve shape.

The joining flange portion 46F, that is superimposed to the dash panel 18 and is then joined to the dash panel 18, is formed at outer peripheral portions of the rearward side of the rectangular cylindrical portion 46A and at outer peripheral portions of the kick portion 46D. The joining flange portion 46F of the front side member base portion 46 is joined to the dash panel 18 (not illustrated in detail in the drawings) by known fixing devices such as tapping screws or the like. An end portion on the inner side in the vehicle body transverse direction of the rear portion of the front side member base portion 46 is joined to a side wall lower portion of the tunnel 22 (not illustrated in the drawings), while an end portion on the outer side in the vehicle body transverse direction of the rear portion of the front side member base portion 46 is joined to the rocker 24 (not illustrated in the drawings). Note that in the present exemplary embodiment, as illustrated in FIG. 1, the rear end portion of the front side member base end portion 46 extends as far as a lower surface side of the front end portion of the floor panel 20.

As illustrated in FIG. 4A, in the rectangular cylindrical portion 46A of the front side member base portion 46, reinforcement ribs 52 are formed at a facing portion 50A that faces the inner-side side wall portion 42B of the front side member main body portion 42. The reinforcement ribs 52 protrude inwards (i.e., towards the opposite side in the vehicle body transverse direction from the side to which the inner-side side wall portion 42B is located) in the vehicle body transverse direction and extend in the vehicle front-rear direction. As an example, three of these reinforcement ribs 52 may be formed, and may be arranged in parallel with each other with equal intervals in the vehicle body up-down direction (not illustrated in the drawings). Note that the three reinforcement ribs 52 are set in the equivalent positions in the vehicle body up-down direction as three abutting ribs 54 (described below). Each reinforcement rib 52 includes a rear side extending portion 52R that extends towards the vehicle body rear side beyond the portion thereof that protrudes inwards in the vehicle body transverse direction, and reaches as far as the joining flange portion 46F (see FIG. 3) of the front side member base portion 46. A ridgeline L1 at an inner side in the vehicle body transverse direction of the reinforcement rib 52 slopes slightly inwards in the vehicle body transverse direction on progression towards the vehicle body rear side.

In contrast, as ribs, abutting ribs 54, are formed in the rectangular cylindrical portion 46A of the front side member base portion 46 at a facing portion 50B that faces the outer-side side wall portion 42A of the front side member main body portion 42. The abutting ribs 54 protrude outwards in the vehicle body transverse direction (i.e., towards the opposite side in the vehicle body transverse direction from the side where the outer-side side wall portion 42A is located) and extend in the vehicle front-rear direction. As an example, three of these abutting ribs 54 may be set, and these are arranged in parallel with each other at equal intervals in the vehicle body up-down direction (see FIG. 3).

The abutting ribs 54 include a front-side extended portion 54F that extends to the vehicle body front side beyond a portion that protrudes outwards in the vehicle body transverse direction, and is positioned at a side of the bead 44. The position of the front end of the abutting ribs 54 is set to an equivalent position in the vehicle body front-rear direction as the position of the front end of the bead 44, and is set to a position at the vehicle body front side of the vehicle body front-rear direction than the position of the recessed bottommost portion (i.e., the deepest part of the recessed portion) of the bead 44. Further, the abutting ribs 54 includes an abutting portion 54A whose front end faces towards the vehicle body front side. When seen in a vehicle plan view, the abutting portion 54A of the abutting ribs 54 bulges slightly towards the vehicle body front side while sloping towards the vehicle body front side on progression towards the outer side in the vehicle body transverse direction. More specifically, when seen in a vehicle plan view, in the abutting portion 54A of the abutting ribs 54, an intermediate portion in the vehicle body transverse direction is formed in a planar shape that slopes towards the vehicle body front side on progression towards the outer side in the vehicle body transverse direction, and each end portion (i.e., the vicinity of each corner portion) at the inner side in the vehicle body transverse direction and at the outer side in the vehicle body transverse direction is formed in a shape that curves in an R-shape.

The abutting portions 54A of the abutting ribs 54 are set in positions where, in a case in which the front side member main body portion 42 is bent towards the outer side in the vehicle body transverse direction from the bead 44 forming the bend starting portion in response to a load being input from the vehicle body front side, they abut against the front side member main body portion 42 before the front side member main body portion 42 is fractured. Namely, the abutting portions 54A of the abutting ribs 54 are set in positions where, in the event of a vehicle frontal collision, they are able to support the front side member main body portion 42 before the front side member main body portion 42 is fractured, and suppress any deformation in the front side member main body portion 42. Moreover, the abutting ribs 54 has sufficient strength and rigidity to be able to suppress any deformation in the front side member main body portion 42 in a case in which, in the event of a vehicle frontal collision, the abutting ribs 54 are supporting the front side member main body portion 54 that has bent from the bead 44 forming the bend starting portion.

Further, the abutting ribs 54 include a rear-side extended portion 54R that extends to the vehicle body rear side beyond the portion that protrudes outwards in the vehicle body transverse direction, and reaches as far as the joining flange portion 46F of the front side member base portion 46.

A ridgeline L2 on an outer side in the vehicle body transverse direction of the abutting ribs 54 slopes slightly outwards in the vehicle body transverse direction on progression towards the vehicle body rear side.

Next, the action of the above-described exemplary embodiment will be described.

Figure 4B:
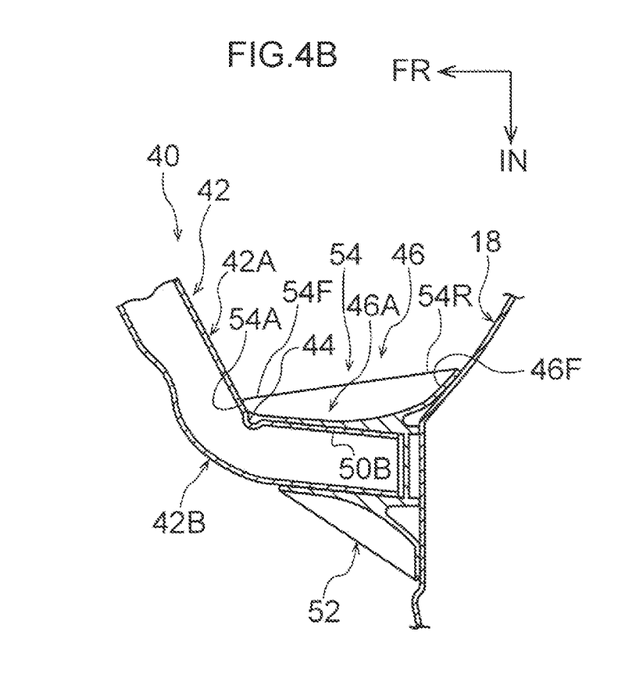
FIG. 4B is a horizontal cross-sectional view illustrating a state of the vehicle body front portion structure illustrated in FIG. 1 after vehicle frontal collision.

As illustrated in FIG. 3, in the present exemplary embodiment, in the front side member main body portion 42, the bead 44 that forms the starting portion of a bend towards the outer side in the vehicle body transverse direction in a case in which a load is input from the vehicle body front side is formed at the rear portion of the outer-side side wall portion 42A, and the front side member base portion 46 is joined to the front side member main body portion 42 so as to cover the external surface of the front side member main body portion 42 at the vehicle body rear side of the bead 44. Because of this, in a case in which a collision load is input into the front side member main body portion 42 during a vehicle frontal collision, as illustrated in FIG. 4B, the front side member main body portion 42 undergoes bending deformation from the bead 44 forming the bend starting portion.

Here, as illustrated in FIG. 4A, the abutting ribs 54, that protrude to the opposite side in the vehicle body transverse direction from the side where the outer-side side wall portion 42A is located, and extend in the vehicle front-rear direction, are provided at the front side member base portion 46 at a facing portion 50B thereof that faces the outer-side side wall portion 42A of the front side member main body portion 42. Further, the abutting ribs 54 include the front-side extended portions 54F and, at a front end thereof, the abutting portions 54A. The front-side extended portions 54F extends to the vehicle body front side beyond the portion protruding outwards in the vehicle body transverse direction, and are positioned at a side of the bead 44. Further, in a case in which the front side member main body portion 42 is bent towards the outer side in the vehicle body transverse direction from the bead 44 forming the bend starting portion in response to a load being input from the vehicle body front side, the abutting portions 54A abut against the front side member main body portion 42. Accordingly, as illustrated in FIG. 4B, in a case in which the front side member main body portion 42 undergoes a predetermined amount of bending deformation with the bead 44 forming the bend starting portion, since the front side member main body portion 42 abuts against the abutting portion 54A of the abutting ribs 54 and is supported by the front-side extended portion 54F, the bending deformation of the front side member main body portion 42 from the bead 44 that forms the bend starting portion may be suppressed. As a result, since fracturing of the front side member main body portion 42 may be prevented or suppressed before occurring, the energy absorption performance of the front side member main body portion 42 may be performed efficiently.

Further, in the present exemplary embodiment, as illustrated in FIG. 4A, the abutting ribs 54 include the rear-side extended portions 54R that extend to the vehicle body rear side beyond the portion that protrudes outwards in the vehicle body transverse direction, and reach as far as the joining flange portion 46F of the front side member base portion 46. Accordingly, as illustrated in FIG. 4B, when vehicle frontal collision occurs, since the abutting ribs 54 are supported by the dash panel 18 side via the joining flange portion 46F of the front side member base portion 46, the front side member main body portion 42 may be supported with even more stability by the abutting ribs 54.

In the present exemplary embodiment, as illustrated in FIG. 1, since the front side member main body portion 42 slopes towards the outer side in the vehicle body transverse direction on progression towards the vehicle body front side, when vehicle frontal collision occurs, bending moment that attempts to bend the front side member main body portion 42 towards the outer side in the vehicle body transverse direction is generated. Here, because the bead 44 is formed at a rear portion of the outer-side side wall portion 42A, when vehicle frontal collision occurs, the present exemplary embodiment may control the bending direction of the front side member main body portion 42 with even greater stability.

As described above, even in a case in which a front side member 40 is formed of an aluminum alloy, the vehicle body front portion structure 10 of the present exemplary embodiment may efficiently absorb the collision energy during a vehicle frontal collision. Note that the same type of action and effects may be obtained in a case in which a front side member 40 is formed of aluminum, magnesium, or a magnesium alloy.

Moreover, in the present exemplary embodiment, since the deformation load to the front side member main body portion 42 are received by the abutting ribs 54, the deformation load may be transmitted to the tunnel 22 and the rocker 24 to which the front side member base portion 46 is joined. Accordingly, the present exemplary embodiment may improve the load transmission efficiency.

Second Exemplary Embodiment

Figure 5A:
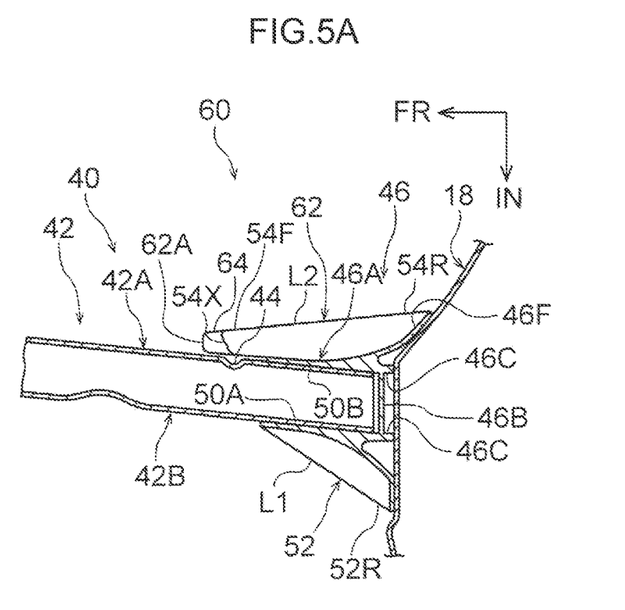
FIG. 5A is a horizontal cross-sectional view illustrating a state of a vehicle body front portion structure according to a second exemplary embodiment prior to vehicle frontal collision.
Figure 5B:
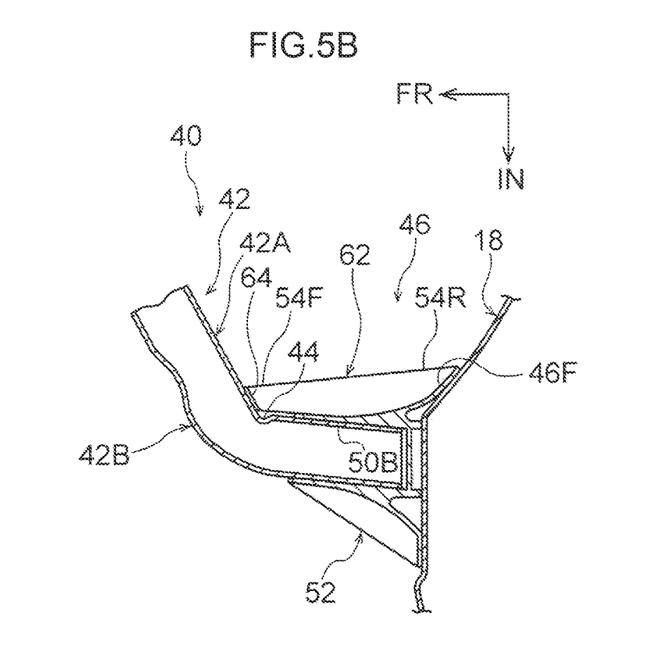
FIG. 5B is a horizontal cross-sectional view illustrating a state of the vehicle body front portion structure according to the second exemplary embodiment after vehicle frontal collision.

Next, a vehicle body front portion structure according to a second exemplary embodiment of the present disclosure will be described using FIG. 5A and FIG. 5B. A vehicle body front portion structure 60 according to the present exemplary embodiment is illustrated in FIG. 5A and FIG. 5B in horizontal cross-sectional views. FIG. 5A illustrates a state prior to vehicle frontal collision, and FIG. 5B illustrates a state after vehicle frontal collision. Note that the present exemplary embodiment has essentially the same structure as the first exemplary embodiment except for the points described below. Accordingly, component elements that are essentially the same as in the first exemplary embodiment are given the same reference numerals and description thereof is omitted.

As illustrated in FIG. 5A, the present exemplary embodiment differs from the first exemplary embodiment in that abutting ribs 62 are provided as ribs instead of the abutting ribs 54 (see FIG. 1 through FIG. 4B). These abutting ribs 62 have essentially the same structure as the abutting ribs 54 (see FIG. 1 through FIG. 4B) of the first exemplary embodiment except for the points described below. Note that the front side member base portion 46 and the front side member 40 differ from the first exemplary embodiment in that they include the abutting ribs 62, however, they have essentially the same structure as in the first exemplary embodiment in all other points. Consequently, for the sake of convenience, the same reference numerals are used as in the first exemplary embodiment. The front side member base portion 46 that includes the abutting ribs 62 is formed of die cast of an aluminum alloy. Note that, in the present exemplary embodiment, the front side member base portion 46 that includes the abutting ribs 62 is formed of an aluminum alloy. However, the front side member base portion 46 that includes the abutting ribs 62 may be formed of aluminum, magnesium, or a magnesium alloy.

A weakened portion 64 that extends towards the vehicle body front side from a front end 54X of the front-side extended portion 54F is formed at the abutting ribs 62. The thickness of the weakened portion 64 is set thinner than in other portions of the abutting ribs 62, and the rigidity towards a load from the vehicle front side is set lower than in other portions of the abutting ribs 62. Abutting portions 62A that face towards the vehicle body front side are provided at a front end of the abutting ribs 62 (i.e., at a front end of the weakened portion 64). The abutting portions 62A take as the surface direction thereof a plane that includes the vehicle body transverse direction. The abutting portions 62A are set in positions where, when the front side member main body portion 42 is bent towards the outer side in the vehicle body transverse direction from the bead 44 forming the bend starting portion in response to a load being input from the vehicle body front side, abut against the front side member main body portion 42 before the front side member main body portion 42 is fractured.

According to the structure of the present exemplary embodiment, as illustrated in FIG. 5B, in a case in which the front side member main body portion 42 undergoes bending deformation in a vehicle frontal collision from the bead 44 forming the bend starting portion, the front side member main body portion 42 abuts against the weakened portion 64 of the abutting ribs 62, and the weakened portion 64 deforms (for example, a bending deformation). As a result, the collision energy may be absorbed by a corresponding amount. When the deformation of the weakened portion 64 of the abutting ribs 62 has ended, since the front side member main body portions 42 are stably supported by the abutting ribs 62, fracturing of the front side member main body portion 42 may be prevented or suppressed before occurring. Accordingly, the collision energy may be more efficiently absorbed when a vehicle frontal collision occurs.

Alternative Examples of the Exemplary Embodiment

Note that, as an alternative example of the above-described exemplary embodiments, the bead (44), as a bend starting portion, may be formed at a rear portion of the inner-side side wall portion (42B) that is hollowed towards the inner side of the closed cross-section (i.e., the internal surface side of the side walls) of the front side member main body portion (42) illustrated in FIG. 4A, FIG. 4B, FIG. 5A, and FIG. 5B, and the abutting ribs (54 and 62) may be formed as ribs on the front side member base portion (46) at the facing portion (50A) thereof that faces the inner-side side wall portion (42B) of the front side member main body portion 42, or at a portion on the vehicle body rear side of this facing portion (50A). In this alternative example, the bead (44) that forms the bend starting portion is the starting portion of a bend towards the inner side in the vehicle body transverse direction when a load is input from the vehicle body front side. Moreover, as another alternative example of the above-described exemplary embodiments, ribs (i.e., abutting ribs) may be provided at a portion of the front side member base portion (46) that is located at the vehicle body rear side of the facing portion (50B) that faces the outer-side side wall portion 42A (i.e., the one side wall portion), such that the ribs protrude to the opposite side in the vehicle body transverse direction from the side where the outer-side side wall portion 42A (i.e., the one side wall portion) is located, and extend in the vehicle body front-rear direction.

In the above-described exemplary embodiments, cases in which the bend starting portion formed at a rear portion of the outer-side side wall portion 42A of the front side member main body portion 42 is in the form of the bead 44, have been described. However, for example, a recessed portion in the form of a row of dots that run in the vehicle body up-down direction may be formed as a bend starting portion in the rear portion of a side wall portion of the front side member main body portion. Further, for example, the bend starting portion may be formed by forming hole portions or modifying thickness of the plate or the like.

Moreover, the description "extending in the vehicle body front-rear direction" include cases in which a component extends in a completely parallel direction with the vehicle body front-rear direction, and also include cases in which a component extends in a direction that is slightly inclined relative to the vehicle body front-rear direction, as the case with the front side member main body portion 42 and the butting ribs 54 and 62 of the above-described exemplary embodiments. However, overall, components that are considered to extend in the vehicle body front-rear direction are included in this description.

Further, as an alternative example of the above-described first exemplary embodiment, the abutting portion of the abutting ribs (54) illustrated in FIG. 4A and the like, may be formed such that the entire range thereof has a flat surface, or may be a plane that includes the vehicle body transverse direction as the surface direction thereof. Further, the abutting portion may include a planar portion that faces towards the vehicle body front side, may include a linear portion that faces towards the vehicle body front side, or may include a dotted portion that faces towards the vehicle body front side. Moreover, a front end side of the abutting ribs, that serves as ribs, may be formed in an R-shape with a protruding portion being provided at a vehicle body front side thereof when seen in a vehicle body plan view. Furthermore, when seen in a vehicle body plan view, the front end side of the abutting ribs may be formed in a protruding acute angle shape at the vehicle body front side thereof, with the apex portion of this acute angle being offset by a predetermined distance in the vehicle body transverse direction from the bend starting portion.

In the above-described exemplary embodiments, a structure in which the abutting ribs 54 and 62 (illustrated in FIG. 4A, FIG. 4B, FIG. 5A, and FIG. 5B) include the rear-side extending portion 54R, have been described. However, a structure in which the abutting ribs, that serves as ribs, are not provided with a rear-side extending portion may be employed. Moreover, a structure in which, although the ribs include a portion that extends towards the vehicle body rear side from the portion thereof that protrudes in the vehicle body transverse direction, this portion is shaped such that it does not reach as far as the joining flange portion, may be employed.

In the above-described exemplary embodiments, cases in which the front side member main body portion 42 slopes towards the outer side in the vehicle body transverse direction on progression towards the vehicle body front side, have been described. This structure is considered in a case in which frontal collisions at an end portion of the outer side in the vehicle body transverse direction of the vehicle occur. However, the front side member main body portion may not be formed sloping in this manner.

In the above-described exemplary embodiments, a structure in which the rectangular cylindrical portion 46A of the front side member base portion 46 is joined by arc-welding to the front side member main body portion 42 so as to cover the entire periphery of the external surface of the front side member main body portion 42 at the vehicle body rear side of the bead 44, has been described. However, the front side member base portion 46 may be joined to the front side member main body portion (42) so as to cover the external surface of at least the pair of left and right side wall portions (42A and 42B) at the vehicle body rear side of the bend starting portion (i.e., the bead 44). Namely, the front side member base portion may be joined to the front side member main body portion (42) so as to cover only by the external surfaces of the pair of left and right side wall portions (42A and 42B), or may be joined to the front side member main body portion (42) so as to cover the external surfaces of each of the pair of left and right side wall portions (42A and 42B) as well as of the top wall portion (42C), or may be joined to the front side member main body portion (42) so as to cover the external surfaces of each of the pair of left and right side wall portions (42A and 42B) as well as of the bottom wall portion (42D).

In the above-described exemplary embodiments, a structure in which the front side member base portion 46 is formed by die cast as a single integrated body with the abutting ribs 54 or 62, has been described. However, a structure in which, for example, abutting ribs, that serves as ribs, are formed separately from the main body portion of the front side member base portion, and are joined by being fastened, arc-welding, or LSW (Laser Screw Welding) to a main body portion of the front side member base portion (via a linear welded portion), may be employed.

In the above-described exemplary embodiments, cases in which three abutting ribs 54 and 62 are formed at the front side member base portion 46, have been described. However, the number of abutting ribs formed as ribs at the front side member bade portion may be a different number from three (for example, two or four).

In the above-described exemplary embodiments, a case in which the vehicle body front portion structures 10 and 60 are configured symmetry to the left and right sides, and the bead 44 and the abutting ribs 54 and 62 are provided at both the left and right sides of the vehicle body, have been described. However, for example, a structure in which the bead (44) is provided as a bend starting portion and the abutting ribs (54 and 62) are provided as ribs only on the right side of the vehicle body, or a structure in which the bead (44) is provided as a bend starting portion and the abutting ribs (54 and 62) are provided as ribs only on the left side of the vehicle body, may be employed.

In the above-described exemplary embodiments, cases in which the front side member main body portion 42 is formed as a single component, have been described. However, the front side member main body portion 42 may be an assembled object that is formed, for example, by assembling an inner panel that forms an inner plate together with an outer panel that forms an outer plate.

In the above-described second exemplary embodiment, a case in which the weakened portion 64 illustrated in FIG. 5A is formed by a thin plate portion, has been described. However, the weakened portion may be formed, for example, by forming a slit or the like such that the rigidity towards a load from the vehicle front side is set lower in the weakened portion than in other portions of the abutting ribs (i.e., the ribs).

Note that the above-described exemplary embodiments and the above-described respective alternative examples may also be implemented in various suitable combinations.

An example of the present disclosure has been described above, however, it should be noted that the present disclosure is not limited to this description, and various additional modifications and the like may be made thereto insofar as they do not depart from the spirit or scope of the present disclosure.

What is claimed is:

1. A vehicle body front portion structure, comprising:
a front side member main body portion formed of aluminum, an aluminum alloy, magnesium, or a magnesium alloy, the front side member main body portion having a left side wall portion and a right side wall portion that extend in a vehicle body front-rear direction at side portions of a vehicle body front portion, and having a bend starting portion formed at a rear portion of one side wall portion of the left side wall portion or the right side wall portion, the bend starting portion forming a starting portion of a bend in a vehicle body transverse direction in a case in which a load is input from a vehicle body front side;
a front side member base portion formed of aluminum, an aluminum alloy, magnesium, or a magnesium alloy, the front side member base portion being joined to a dash panel, and being joined to the front side member main body panel at portions located further to a vehicle body rear side than the bend starting portion so as to cover an external surface including at least the left side wall portion and the right side wall portion; and
ribs protruding toward an opposite side in the vehicle body transverse direction from the side at which the one side wall portion is located and extending in the vehicle body front-rear direction, the ribs being provided at a facing portion of the front side member base portion that faces the one side wall portion or at a location to the vehicle body rear side of the facing portion, each of the ribs having a front-side extended portion that extends to the vehicle body front side beyond a portion that protrudes in the vehicle body transverse direction and that is positioned on a side of the bend starting portion, and each of the ribs having, at a front end, an abutting portion that, in a case in which the front side member main body portion is bent in the vehicle transverse direction with the bend starting portion forming the starting portion in response to the load being input from the vehicle body front side, abuts against the front side member main body portion.

2. The vehicle body front portion structure according to claim 1, wherein:
a joining flange portion joined to the dash panel is provided at the front side member base portion; and
each of the ribs is provided with a rear-side extended portion extending to the vehicle body rear side beyond the portion protruding in the vehicle body transverse direction, and reaching as far as the joining flange portion.

3. The vehicle body front portion structure according to claim 1, wherein a weakened portion, extending towards the vehicle body front side from a front end of the front-side extended portion, is formed at each of the ribs, and rigidity with respect to the load from the vehicle front side is lower at the weakened portion than at other portions of the ribs.

4. The vehicle body front portion structure according to claim 1, wherein the front side member main body portion slopes towards an outer side in the vehicle body transverse direction on progression towards the vehicle body front side, and the bend starting portion is formed at a rear portion of an outer-side side wall portion located at an outer side in the vehicle body transverse direction from among the left side wall portion and the right side wall portion.

* * * * *